United States Patent
Yuan

[15] 3,692,259
[45] Sept. 19, 1972

[54] WING-TIP VORTICES CONTROL

[72] Inventor: Shao Wen Yuan, 2021 Highboro Way, Falls Church, Virginia 22043

[22] Filed: June 26, 1970

[21] Appl. No.: 50,179

[52] U.S. Cl....................................................244/40
[51] Int. Cl................................................B64c 23/06
[58] Field of Search..244/40, 41, 1, 42, 42.41, 17.11, 244/17.13; 115/34; 416/92, 90, 91, 90 A, 20

[56] References Cited

UNITED STATES PATENTS

| | | |
|---|---|---|
| 3,596,854 | 8/1971 | Haney, Jr. .....................244/40 |
| 3,604,661 | 9/1971 | Meyer, Jr. ...............244/42 CC |
| 2,477,461 | 7/1949 | Lee................................244/40 |
| 2,650,781 | 9/1953 | Taylor............................244/40 |
| 3,480,234 | 11/1969 | Cornish.........................244/40 |
| 2,511,156 | 6/1950 | Glass..............................416/20 |
| 2,705,051 | 3/1955 | Hauser..........................416/20 |
| 2,408,788 | 10/1946 | Ludington et al. ...........416/20 |

FOREIGN PATENTS OR APPLICATIONS

| | | |
|---|---|---|
| 1,143,952 | 10/1957 | France..........................415/92 |

*Primary Examiner*—Duane A. Reger
*Assistant Examiner*—Carl A. Rutledge
*Attorney*—Charles E. Brown, Vincent L. Ramik, William H. Holt, Alfred W. Bruner, John Snyder and Diller, Brown, Ramik & Holt

[57] ABSTRACT

This invention is for wings of all types, such as fixed wings for aircraft and hydrofoil boat, and rotary blades (or wings) for helicopters and turbines, to be equipped with a row of chordwise tangential jets along the edge or end surfaces of the wing tips for counterbalancing and controlling the wing-tip or blade-tip vortices.

19 Claims, 13 Drawing Figures

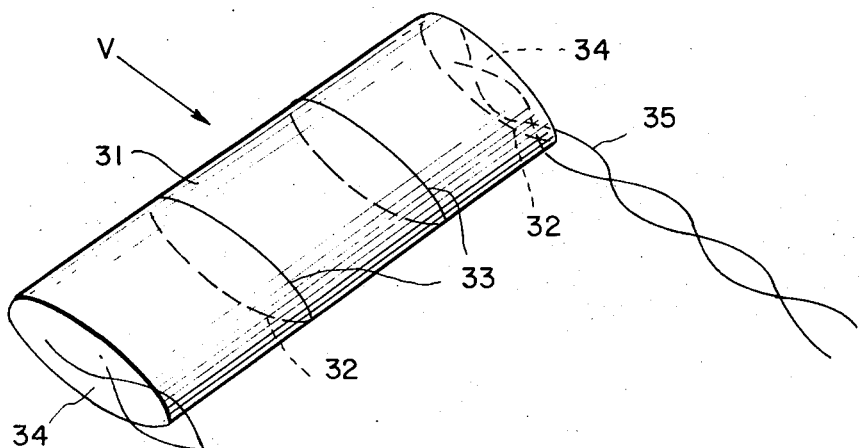
FIG. 1
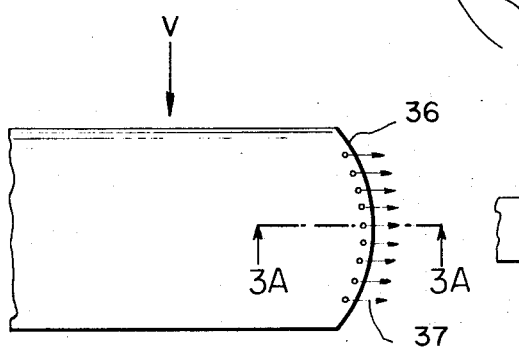
FIG. 2
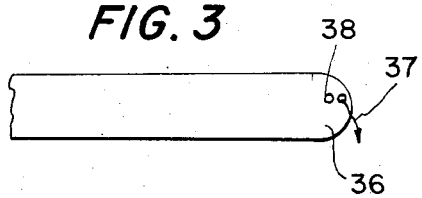
FIG. 3
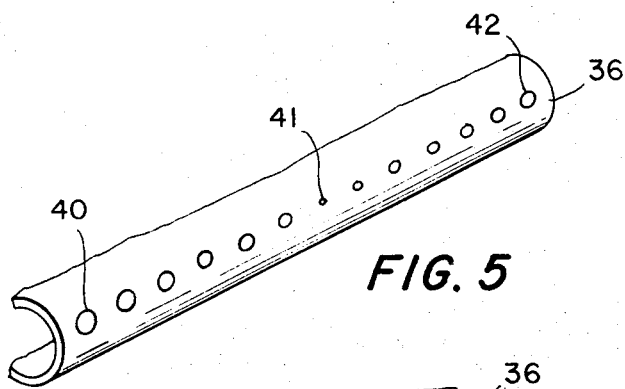
FIG. 5
FIG. 3A
FIG. 4
INVENTOR
SHAO WEN YUAN

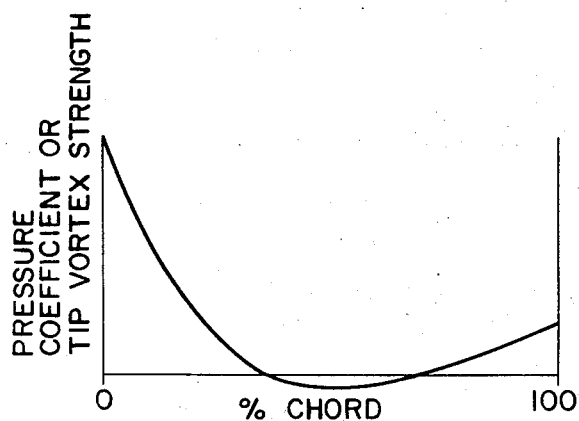
FIG. 6
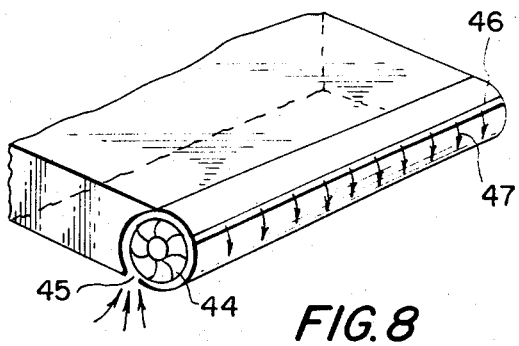
FIG. 8
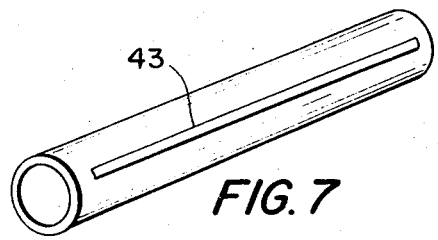
FIG. 7
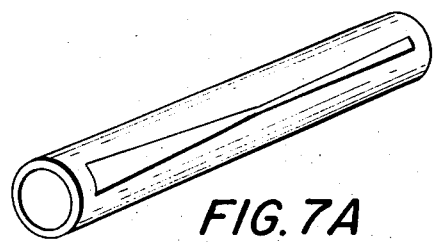
FIG. 7A
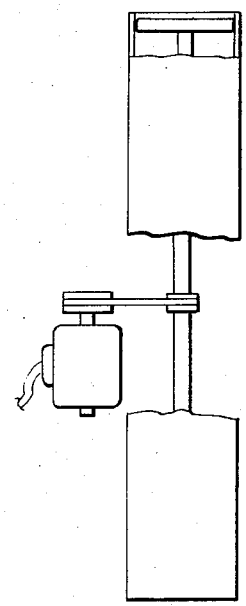
FIG. 8A
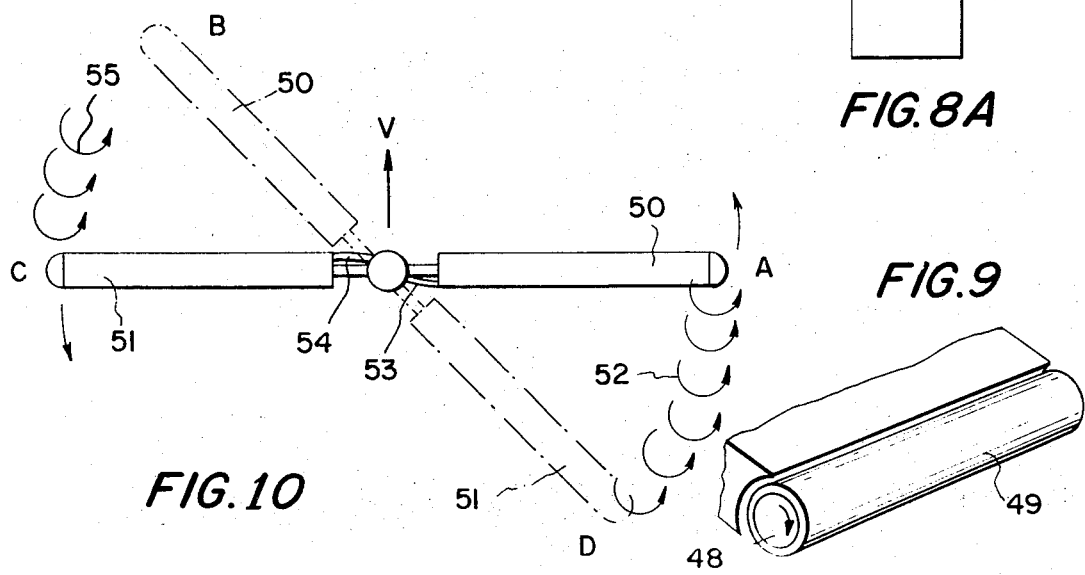
FIG. 10
FIG. 9

WING-TIP VORTICES CONTROL

This invention relates to apparatus and equipment for reducing or eliminating disturbances and includes means for controlling tip-vortices of wings of practically all types, particularly fixed-wing crafts (airplanes, missiles, V/STOL, ships, boats and the like) having wings for supporting and controlling the crafts; and rotary-wing machines (helicopters, autogiros, gyrodynes, convertible crafts, compressors, turbines, blowers, propellers, and the like) to which wings or blades are attached (to the rotor) for sustaining, propelling and controlling the machines. I define "wing" as a structural member of a vehicle or machine which moves relatively in a fluid. By way of illustration, this invention will, however, be shown and described mostly as incorporated in an airplane and a helicopter with suitably attached wings or blades as to which the invention has distinct advantages.

For a flow of fluid past a wing of infinite length (attached, e.g., to a flying machine such as an airplane) the various pressure above and below it are constant along the span because the pressure distribution is the same for all planes perpendicular to the wing plan form (in the chordwise direction). In the flow past a wing of finite span which is subject to lift, the situation changes radically, because there is then a difference between the pressure above and below the body. This results in a rush flow of fluid around the ends of the wing (wing tips), from the region of higher pressure (low surface) to the region of lower pressure (upper surface). Through the motion of the fluid from the inner portion of the span toward the tips on the lower surface of the wing, and from the tips toward the inner portion on the upper surface of the wing, there are set up vortices aligned with the stream (FIG. 1). These vortices are strongest near the tips (it will be called wing-tip vortices), where the difference between outward and inward velocities is greatest, but their strength falls off to zero toward the center of the wing span.

As the airplane moves forward, the wing-tip vortices trail behind and remain in the air for an extended length of time. These wing-tip vortices have cause fatalities, serious air disturbance, and damage, to incoming flying machines, animals, buildings and structures when they enter into, or are situated inside, the region of these vortices. In the case of rotary-wing aircrafts, in addition to the above mentioned disturbance, the following blade which passes over the vortices generated by the preceding blade undergoes a severe impulsive loading. This is one of the major sources of helicopter rotor noise which is often referred to as blade slap. In addition to the above-mentioned adverse aspects of wing-tip vortices, it also causes a reduction of lift per unit span due to tip loss.

The present invention reduces or obviates the aforementioned inherent disturbance since it provides a wing-tip for wing or blade having new means for alternating the undesirable wing-tip vortices.

For accomplishing the foregoing object, the invention more particularly contemplates the use of a specially provided, round wing-tip which has a generally streamlined connecting portion between the upper surface and lower surfaces of the wing. Specifically the wing-tip is provided with at least one slot in a conduit extending along the chordwise direction of the wing-tip for blowing jets of air (or other fluid) at preselected locations along well-chosen directions thereby achieving circulation to counter-balance the undesirable wing-tip vortices.

Accordingly, an important object of the invention is to diminish or eliminate the above described air or water disturbances, particularly vortices, from relatively moving vehicles.

Another object is to provide fixed- and rotary-wing aircrafts or other rotary machines with novel tangential jet means to achieve circulation, and hence to alleviate the undesirable wing-tip vortices, and to increase the lift per unit span.

Another object is to provide, for a wing or a rotor-blade special jets having control means for changing the magnitude of the met momentum and thereby counterbalancing the variable strength of the undesirable wing-tip vortices.

A further object is to provide a tip-vortex control means of the above outlined characteristics whose jet momentum is varied in the chordwise direction according to the chordwise distribution of the undesirable wing-tip vortices.

A still further object is to provide a new means for cyclically altering the tip jet momentum of the rotor blades during the forward flight of a VTOL craft thereby counterbalancing the cyclically varying wing-tip vortices.

Another object of the invention is to provide a tip-vortex control means of the above-outlined characteristics so as to reduce the undesirable blade tip-loss and blade slap.

Still another object is to provide a vortex control means of the above described type which incorporates blown jets along the span of the trailing edge of the blade with different magnitude and orientation with respect to the span of the blade, thereby giving different and favorable lift coefficients along the blade span and reducing wing-tip vortices.

Still another object is to provide a tip-vortex control means of the above described type which is capable of changing the direction of the jets according to the direction of the variation of wing-tip vortices.

Further objects and advantages of my invention will appear as the specification proceeds.

The preferred forms of the invention are illustrated in the accompanying drawings, in which:

FIG. 1 is a diagrammatic view of wing-tip vortices;

FIG. 2 is a top view of a wing tip or a rotor-blade tip employing this invention;

FIG. 3 is a rear view of a wing tip or a rotor-blade tip employing this invention;

FIG. 3A is an enlarged vertical sectional view taken on line 3A—3A of FIG. 3;

FIG. 4 illustrates a wing or blade tip having multiple tangential jets;

FIG. 5 shows an arrangement of a variable jet-hole diameter according to the chordwise pressure distribution;

FIG. 6 represents a typical chordwise pressure distribution, hence also a wing-tip vortex strength distribution;

FIG. 7 is side view of a wing tip having an infinite number of jet openings in the form of a continuous slot;

FIG. 7A shows a variable jet slot according to the chordwise pressure distribution;

FIG. 8 is a diagrammatic view showing a transverse blower attached to the wing tip;

FIG. 8A illustrates a transverse fan driven by an electric motor;

FIG. 9 shows a novel rotating circular-cylinder control means which is mounted on the wing tip;

FIG. 10 is a top plan view of a rotor blade assembly without the main body portion and including direction symbols and wing-tip vortices.

Referring to FIG. 1, there is shown a wing 31 which is attached to an airplane (not shown). When the airplane flies forward the gross weight of the airplane is sustained by the lift which is produced by the wing. The production of lift by the wing is due to a strong positive pressure on the lower surface 32 of the wing and a suction or negative pressure on the upper surface 33 of the wing. Consequently, there is a difference in pressure between the two surfaces of the wing which results in a rush flow of air around the ends (or other discontinuities in the wing structure short circuiting the pressure differences) of the wing (for example, the wing tips) 34, from the region of higher pressure (lower surface 32) to the region of lower pressure (upper surface 33). Through the motion of the air from the inner portion of the span 32 toward the tips 34 on the lower surface of the wing, and from the tips 34 toward the inner portion on the upper surface 33 of the wing, there are set up wing-tip vortices 35 aligned with the stream of incoming flow.

As the airplane moves forward the wing-tip vortices trail behind and remain in the air for an extended length of time. These wing-tip vortices will cause serious disturbances or even damage to incoming flying, or nearby stationary, objects when they enter into, or are located inside, the region of influence of these vortices. The same adverse situation occurs in water where the wing-tip vortices are generated, for example, by the hydrofoils. In the case of rotary-wing aircraft, the situation is even worse, in addition to the above mentioned disturbance left behind by the wings or blades, the following blade which passes through the vortices generated by preceding blade undergoes a severe impulsive loading. This is one of the major sources of helicopter rotor noise which is often referred to as blade slap. In addition, it also results in a considerably reduction of lift force per unit span which is usually referred to as blade tip-loss.

The invention contemplates the use of a round wing tip 36 (see FIGS. 2 and 3) provided with at least a blowing fluid jet 37. This fluid jet (fluid source not shown) ejects from air orifice opening 38 (see FIG. 3A for enlarged view) tangentially along the wing tip's surface, from the upper surface (or the lower pressure surface). In this manner the fluid jet flow forms a clockwise (see FIG. 3) circulating flow which counterbalances the counterclockwise flow of the wing-tip vortices. Thus, the present invention uses the principle of circulatory flow control to produce rotational flow and to alleviate the wing-tip vortices.

FIG. 4 is a modification of the wing-tip vortices control shown in FIGS. 2 and 3. The modification involves one addition tangential jet 39 which is positioned ahead of the original tangential jet along the wing tip as shown in FIG. 4. However, this additional jet may be replaced or supplemented by another tangential jet placed behind the original tangential jet. The additional fluid jet is provided to increase the strength of the circulatory flow, hence to more effectively counter-balance the wing-tip vortices. Although the mass flow of the original tangential jet 37 can be increased or decreased by a flow regulator (not shown) it may not stay tangentially along the entire wing-tip contour if the jet velocity is too high. Hence, the additional tangential jet 39 is provided to assure an efficient operation in alleviating the wing-tip vortices.

The chordwise pressure distribution is by no means uniform. Usually, at a range of operating wing angle of attack, the peak pressure (positive on the lower surface and negative on the upper surface) occurs near the leading edge of the wing and a typical nondimensional pressure distribution (or pressure coefficient) as a function of percent chord is shown in FIG. 6. Consequently, it is desirable to have jets with tangential air mass flow varying in accordance with the pressure variation, to improve the efficiently of jet usage. In other words, the jet with the largest tangential mass flow should be located at the position of peak pressure. There are several means to accomplish this mass flow control, one of the simplest yet effective is to vary the orifice size from which jet is issued. FIG. 5 shows the end view (or side view) of a wing tip 36 in which the jet-orifice sizes decrease from the largest orifice 40 at one end of the chord to the smallest 41 near the center of the chord according to the pressure variation shown in FIG. 6. The orifice size then increases from orifice 41 to 42 at the other end.

While in FIG. 5 there is disclosed a multiplicity of relatively closely spaced jet orifices, such orifices if increased to an infinite number result in a slot 43 as shown in FIG. 7. As shown in FIG. 7A the width of the slot can be made variable to match the chordwise pressure distribution or variation shown in FIG. 6, also for improved efficiency of jet usage.

In the above descriptions air or gas supply for the fluid jets is made available from a suitable main source in the craft (such as a blower, compressor, stored compressed gas, or the like) and is conveyed through conduits to the wing-tip slot (or orifices) through which the air jet is ejected. A modification of the air supply means to the jet slot is illustrated in FIG. 8 wherein a transverse blower 44 is mounted at the wing tip (a transverse blower driven by an electric motor is shown in FIG. 8A). In this case the blower 44, rotating in clockwise direction, draws the air from the lower surface 45 of the wing tip and delivers it to the slot 46 through which the air jet is ejected. The advantage of this device is that the air is drawn in from the high pressure region and ejected at the low pressure region, hence power supply for the jet flow can be considerably reduced. Although only a single slot is shown in FIG. 8, multiple slots (similar in function to those in FIG. 4) can be conveniently installed.

Another form of the invention is disclosed in FIG. 9 wherein a circular cylinder 48 is mounted on the wing tip and becomes the very end portion of the wing tip 49. The circular cylinder 48 may be operated by an electric motor (in a similar manner as shown in FIG. 8A) or the like in order that it is rotated in the direction opposite to the direction of wing-tip vortices. The speed of the rotation of the cylinder can be easily controlled under prescribed conditions. This speed can even by automatically controlled so as to increase or decrease with the strength of the tip vortices if suitable vortex or other sensing means and some accessory means are provided. A vortex sensing meter may be used to sense the strength of the tip vortices and, through a resistor, to control the speed of the motor. While the cylinder is rotating, the fluid adjacent to the cylinder rotates (because fluid is viscous) simultaneously with the cylinder. This creates a circulatory flow along the wing-tip 49 (a rotating wing tip now) which counter-balances the wing-tip vortices.

The invention so far has been illustrated mostly in connection with wing-tip vortices control for an airplane. In the case of a marine craft moving in water, the hydrofoil generates very similar, if not identical, vortices at its tip. Furthermore, the marine propellers generate similar tip vortices. In a like manner, my invention described above can be used to alleviate these tip vortices occurring in these marine crafts.

Referring to FIG. 10, there is shown a top view of a VTOL rotor with two blades attached. When the VTOL craft is hovering or in vertical ascent, the rotor blades act in a manner similar to that of propeller blades. During its rotation the blade 50 originally at position A moves to a position B, and the blade 51 originally at position C now moves to position D. It can be easily seen that the blade 51 at position D encounters the region of vortices 52 which was shed by the blade tip of blade 50. This causes a severe impulsive loading on the following blade 51 which is one of the major sources of VTOL rotor noise (often referred to as blade slap). In addition it also causes a considerable reduction of lift per unit span which is referred to as blade-tip loss. Similarly, blade 50 at position B is disturbed by the vortices 55 shed by blade 51. Similar or even worse situations occur for a three-or more-bladed rotor.

When the helicopter (or VTOL) is in hovering or vertical ascent flight condition, the alleviation of the blade-tip vortices can be made in a like manner by what has been disclosed above. This is because the blade sustains the same load at any azimuth position. Further, each of the two blades sustains exactly one-half of the gross weight of the craft. For forward flight the lift force on the blade varies as a harmonic function of the azimuth position. This, in turn, produces cyclical wing-tip vortices. In order to counter-balance the cyclical wing-tip vortices the air supply to the jet orifice can be provided with regulating means (similar to the one shown in FIG. 9 of prior U.S. Pat. No. 3,446,288) for cyclically altering the jet mass flow during the rotation. This gives the desired amount of air flow to the respective jet orifices through pipes 53 and 54 in the blades 50 and 51 respectively, at any given azimuth position.

The particular advantages of the wing-tip vortices control applied to aircraft, marine craft and turbomachinery are as follows:

1. To diminish or eliminate the vortex pollution in atmosphere and in water which could otherwise endanger other aircraft or marine craft as they enter the vortex polluted region.
2. To alleviate the VTOL rotor noise due to blade slap which is one of the serious problems in noise pollution.
3. To diminish or eliminate blade-tip loss, hence increase the total lift considerably for a given rotor configuration.
4. To reduce the noise and increase the efficiency of most turbo-machineries.

The above-mentioned important features of wing-tip vortices control readily identifies the uniqueness of my invention.

While only several specific embodiments are hereinbefore illustrated and described, it is to be expressly understood that this invention is not intended to be limited to the exact formations, constructions, or arrangement of parts as illustrated and described, because various modifications may be developed in putting the invention to practice within the scope of the appended claims.

What is claimed is:

1. In a wing of finite span subject to lift or thrust in a fluid as a result of difference in fluid pressure on one side thereof relative to that on the opposite side and having fluid disturbances at the tip of said wing caused by a rush flow of said fluid from the side of higher pressure to the side of lower pressure, and means for producing fluid flow along a curvilinear surface of said tip in a selected direction at an intensity sufficient for materially reducing said disturbances.

2. The wing of claim 1 wherein said disturbances are vortices, said rush flow being a vortex flow, said means being oriented for producing circulatory flow substantially in a direction opposite to that of said vortex flow.

3. The wing of claim 2 wherein said means comprises a fluid jet and includes means for discharging said fluid jet substantially tangential along said tip directed from said lower pressure side toward said higher pressure side.

4. The wing of claim 3 wherein said vortices vary in intensity and including means for altering the momentum of said fluid jets in accordance with the variation in said intensity.

5. The wing of claim 3 wherein said means comprises a transverse blower mounted at said tip and rotatable in a direction opposite that of said vortex flow for drawing fluid from said higher pressure side of said tip and discharging said fluid from said lower pressure side toward said higher pressure side.

6. The wing of claim 3 including an additional jet for keeping said fluid jet tangential along the contour of said tip.

7. In a wing of finite span subject to lift or thrust in a fluid as a result of difference in fluid pressure on one side thereof relative to that on the opposite side and having fluid disturbances at the tip of said wing caused by a rush flow of said fluid from the side of higher pressure to the side of lower pressure, jet means for discharging a fluid jet in a selected direction at an intensity sufficient for materially reducing said disturbances, wherein said disturbances are vortices and said fluid jet is oriented for producing flow opposite to that of said rush flow, said jet means comprising a tangential jet means for blowing said fluid jet substantially tangentially along said tip directed from said lower pressure side toward said higher pressure side, wherein the chordwise pressure distribution on said wing is nonuniform and said tangential jet means comprises a plurality of tangential fluid jets, and including means for controlling said fluid jets so that they have momentum varying in magnitude in the chordwise direction generally in direct proportion to the chordwise distribution of said vortices.

8. The wing of claim 7 wherein the tangential fluid jet with the largest tangential mass flow is located at the position of peak pressure.

9. The wing of claim 1 wherein said means comprises an axial rotatable member mounted on said tip and forming the end portion thereof, the axis of rotation of said rotatable member being generally in the direction of the axis of said vortices, and means for rotating said rotatable member in the direction opposite to that of said vortices for causing the fluid adjacent thereto to rotate simultaneously therewith for creating a circulatory flow along said tip for counterbalancing said vortices.

10. The wing of claim 9 including sensing means for sensing the intensity of said vortices, and regulating means for controlling the rotational speed of said rotatable member in accordance with said intensity as sensed by said sensing means.

11. The wing of claim 3 wherein said means comprises a row of chordwise tangential fluid jets in said wing tip along the lower pressure side and pointing toward said higher pressure side of said wing.

12. The wing of claim 11 wherein said tangential jets vary in sizes from the position of peak pressure toward either end of said wing chord.

13. The wing of claim 11 wherein said tangential jets vary in fluid mass flow rate from the position of peak pressure toward either end of said chord.

14. The wing of claim 11 wherein said tangential jets form a continuous jet slot along said wing tip, said slot varying in width from the position of peak pressure toward either end of said chord.

15. In a human or cargo transportation vehicle of the type relatively movable in a fluid medium at a speed sufficiently high to cause the generation of a trailing vortex about a vortex-producing structural member thereon, a positively pressurized fluid jet means for producing a fluid jet in the vicinity of the source of generation of said vortex and arranged and directed substantially tangential along said structural member for materially reducing said vortex.

16. The vehicle of claim 15 wherein said vehicle is in the form of a boat in water and said vortex-producing member comprises an at least partially submerged propeller.

17. The vehicle of claim 15 wherein said vehicle is a helicopter and said vortex-producing structural member is a rotor blade thereof, said fluid jet means discharging fluid from the tip of said rotor blade, and means for cyclically altering the intensities of said fluid jet in accordance with the angle of rotation of said blade.

18. The vehicle of claim 15 wherein said vehicle is a helicopter and said vortex-producing structural member is a rotor blade thereof, and said fluid jet means discharges fluid from the tip of said rotor blade.

19. In a wing of finite span subject to lift or thrust in a fluid as a result of difference in fluid pressure on one side thereof relative to that on the opposite side and having fluid disturbances at an edge of said wing caused by a rush flow of said fluid from the side of higher pressure to the side of lower pressure, and means for producing fluid flow along a surface of said edge in a selected direction and at an intensity sufficient for materially reducing said disturbances.

* * * * *